United States Patent [19]
Carp et al.

[11] 3,802,749
[45] Apr. 9, 1974

[54] ADAPTIVE BRAKING SYSTEM CONTROL WHEEL SELECTION BY VELOCITY COMPARISON

[75] Inventors: Ralph W. Carp; Robert E. Weber; Harold E. Weissler, II, all of Newport News, Va.; John T. Kasselmann, Southfield, Mich.

[73] Assignee: The Bendix Corporation, Southfield, Mich.

[22] Filed: May 4, 1973

[21] Appl. No.: 357,294

[52] U.S. Cl............ 303/21 BE, 303/20, 303/21 EB
[51] Int. Cl................................................. B60t 8/08
[58] Field of Search............... 188/181; 303/20, 21; 317/5; 324/161–162; 340/52 R, 53, 262–263

[56] References Cited
UNITED STATES PATENTS

| | | | |
|---|---|---|---|
| 3,482,887 | 12/1969 | Sheppard | 303/21 BE |
| 3,535,004 | 10/1970 | Howard et al. | 303/21 EB |
| 3,682,515 | 8/1972 | Packer et al. | 303/21 BE |
| 3,744,851 | 7/1973 | Burckhardt et al. | 303/21 BE |
| 3,756,663 | 9/1973 | Fink et al. | 303/21 BE |

*Primary Examiner*—Milton Buchler
*Assistant Examiner*—Stephen G. Kunin
*Attorney, Agent, or Firm*—W. G. Christoforo; Bruce L. Lamb

[57] ABSTRACT

An adaptive braking system in which the speed of each wheel on an axle is independently sensed but the braking pressure of both axle wheels is controlled during adaptive braking by a single brake pressure modulator. Performance information from the wheel having the higher speed is used to determine when brake pressure should be reduced. Performance information from the wheel having the lower speed is used to determine when the brake pressure should be subsequently increased. If the ratio of the speed of the low speed wheel with respect to the speed of the high speed wheel drops below a predetermined level, the wheel having the higher speed controls adaptive braking.

8 Claims, 2 Drawing Figures

3,802,749

ADAPTIVE BRAKING SYSTEM CONTROL WHEEL SELECTION BY VELOCITY COMPARISON

BACKGROUND OF THE INVENTION

This invention relates to adaptive braking systems for wheeled vehicles, also referred to as an anti-lock system, having select high and select low control logic of the type wherein the dynamic performance of at least two wheels are individually sensed and that wheel performing in a predetermined manner with respect to the performance of the other sensed wheels is selected to control the adaptive braking on all of the sensed wheels.

Adaptive brake control on an axle basis is generally used in certain adaptive braking systems because of its cost advantage when compared to a system having individual wheel control. It is generally desirable in an axle control system that the speed of each wheel on the axle be sensed individually but that the brake pressure to all wheels on the axle be controlled by a single brake pressure modulator during adaptive braking.

The system designer has had a choice of three types of such axle control systems, select low wheel speed, select high wheel speed, and select the average speed of all wheels on the axle. The low speed wheel is generally the wheel which has the poorest tire-road interface conditions with respect to braking ability. In other words, the low speed wheel is usually running on a slippery surface.

In the case where the tire-road interface conditions are uniform with respect to the various wheels on the axle, the wheel with the most effective brake will generally be at the lowest speed. An automatic braking system which operates to prevent wheel lock using the low speed wheel as the information source will provide the best stability since no wheel on the axle will lock during a stop. However, where the low speed wheel is used as the information source the stopping distance of the vehicle will increase in those cases where the tire-road interface conditions of the various wheels are not uniform or where the braking force on the various wheels is greatly unbalanced since the braking force on all wheels, except for the controlling wheel, will be less than optimum.

The selection of the high speed wheel as the information source provides the shortest stopping distance for unbalanced brakes or cases where the tire-road interface at the various wheels is not uniform. However, with this latter type of system one wheel can lock at any time with the result that vehicle lateral stability will be compromised.

Selecting the average speed of the various wheels, like the select high scheme, permits one wheel to lock, and has the additional disadvantage of effectively reducing the sensitivity of the adaptive braking system control logic to the wheel which is not locked. This reduction in sensitivity can result in deep slip cycles or the locking of all wheels.

SUMMARY OF THE INVENTION

An adaptive braking system will be described wherein the braking pressure of all wheels on an axle is controlled in response to the speed of one of the wheels which is chosen by comparing the speed of the various wheels. During adaptive braking the speed information from the high speed wheel is used to determine when braking pressure should be reduced. This insures that the wheel having the highest braking efficiency will develop significant braking torque. Subsequently, information from the low speed wheel is used to determine when brake pressure should begin to increase. This will normally insure that the low speed wheel, that is the wheel which is least efficient in braking the vehicle, will have increased significantly in speed, thus eliminating or greatly reducing the tendency of the low speed wheel to go into lock-up.

If the brakes to the various wheels are not unbalanced and the tire-road surface interface is uniform on various wheels, stopping distance will be the same for all selection methods and lateral stability will be good. However, there is normally a moderate unbalance in the tire-road interface and/or brake balance, in which case this new means of selecting the controlling wheel will provide shorter stopping distance than the select low method, and will additionally reduce the tendency of the low speed wheel to lock.

It is known that when one wheel, during braking, locks or otherwise attains a speed which is very much less than the speed of another wheel, then it is likely that the locked or slow wheel is running on a very slippery surface. In this case, it is best to allow the slow wheel to lock and control the adaptive braking using information received from the high speed wheel.

An object of this invention is to provide an adaptive braking system having high and low speed control wheel selection.

DESCRIPTION OF THE PREFERRED EMBODIMENT

Figure 1:
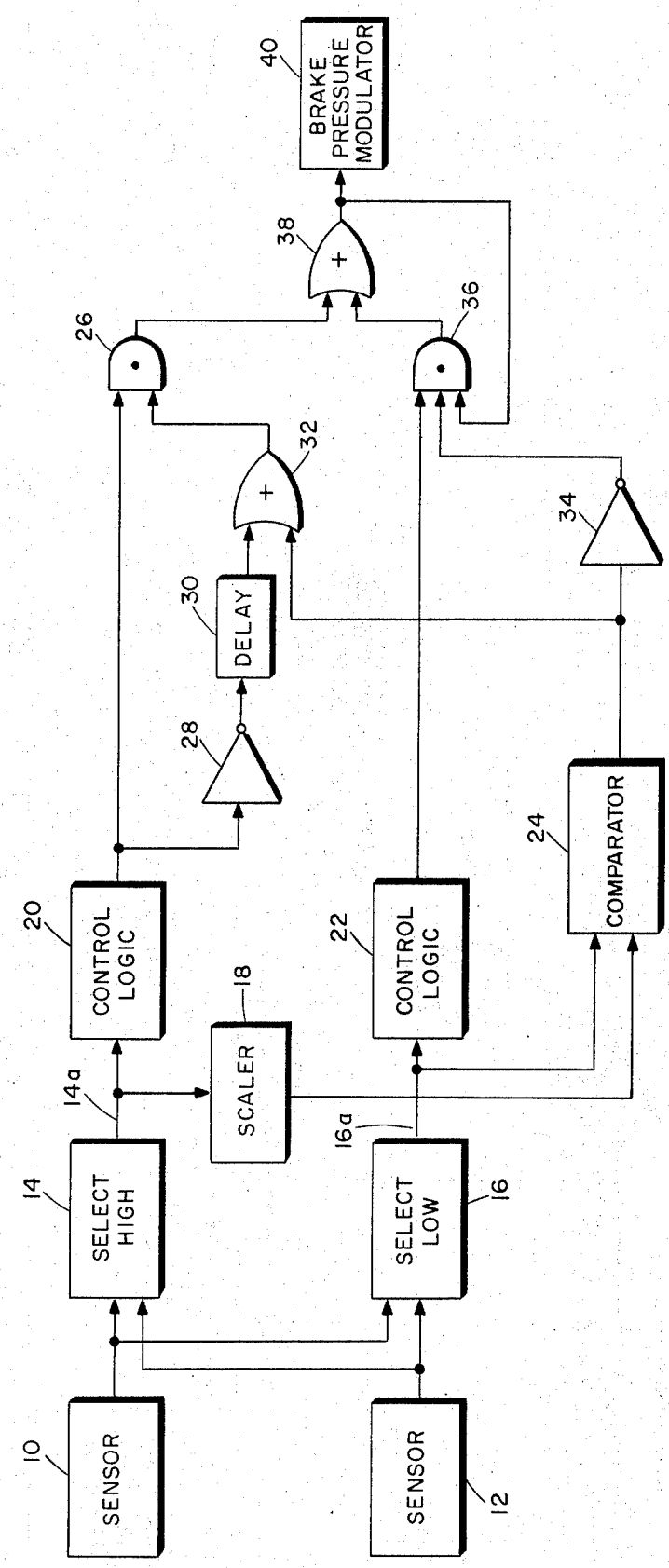
FIG. 1 is a block diagram of the invention.

Refer first to FIG. 1 where there is seen sensors 10 and 12. It is assumed in this embodiment that sensor 10 is ganged to one wheel on a particular vehicle axle while sensor 12 is ganged to the second wheel of the same vehicle axle. Each sensor generates an electrical output signal which is proportional to the speed of its associated wheel. As will be shown as this description proceeds, the signals generated by sensors 10 and 12 eventually operate to control a brake pressure modulator 40 during adaptive braking to thereby modulate the brake pressure at both sensed wheels suitably simultaneously. In other words, a single brake pressure modulator is used to control the braking torque on both axle wheels during adaptive braking. The signals from each sensor, which are normally d.c. voltage signals, are applied individually to a select high circuit 14 and to a select low circuit 16. Select high and select low circuits of a suitable type are well known in this art and need not be described at length here. Briefly, a select high circuit reproduces at its output 14a the signal generated by the sensor ganged to the faster rotating wheel. For example, if the voltage level of the sensor output increases as wheel speed increases then the select high circuit will select the high voltage input signal and reproduce it at line 14a. In like manner, the select low circuit selects the signal generated by the sensor ganged to the lower speed wheel, for example, in this illustration, the lower voltage signal, and reproduces it at its output 16a. In any event, the select high circuit 14 selects that input signal corresponding to the faster sensed wheel, while select low circuit 16 selects that input signal which corresponds to the slower moving wheel.

Control logic 20 and 22, respectively, receive as inputs thereto the signals from select high circuit 14 and select low circuit 16. Control logic circuits are also well known in this art and briefly, respond to a predetermined sequence of signals or change in input signals to generate output signals which are used to automatically control vehicle braking. For example, control logic might consider the speed of a sensed wheel and operate to attenuate braking pressure if the change in wheel speed indicates that the wheel had decelerated in excess of a predetermined reference and may subsequently operate to restore braking pressure when the wheel speed signal indicates that the wheel has accelerated in excess of another predetermined reference. The exact form of the control logic is not a part of this invention, it only being necessary to mention that control logic 20 operates in response to the signal from the faster rotating wheel, while control logic 22 operates in response to the signal from the slower rotating wheel.

The output signal from control logic 20 is applied directly to an AND gate 26 and also indirectly through an inverter 28, a delay circuit 30 and an OR gate 32. OR gate 32 receives as a second input thereto an output signal from comparator 24 whose function will be described below. The output signal from control logic 22 is applied directly to AND gate 36 which receives a second input from comparator 24 which is delivered through inverter 34. A third input to AND gate 36 is received from the output of OR gate 38, this output also comprising the signal to the brake pressure modulator 40. OR gate 38 receives as inputs the signal outputs from gates 26 and 36. Comparator 24 compares the speed of the low speed wheel with a percentage of the speed of the high speed wheel, this percentage being obtained from a scaler 18 connected between line 14a and an input to the comparator. It is assumed in this illustration that comparator 24 generates a logic one output signal when the signal on line 16a indicates that the slower rotating wheel is rotating slower than the percentage of high speed signal obtained from scaler 18. In this case, that is when comparator 24 generates a logic one output, gate 36 is maintained closed due to the inverting action of inverter 34 while gate 26 is maintained qualified by the signal passing through gate 32. In this manner, whenever the low wheel speed becomes less than the predetermined portion of the high wheel speed, the high speed wheel controls both brake pressure attenuation and subsequent brake pressure rebuild.

Figure 2:
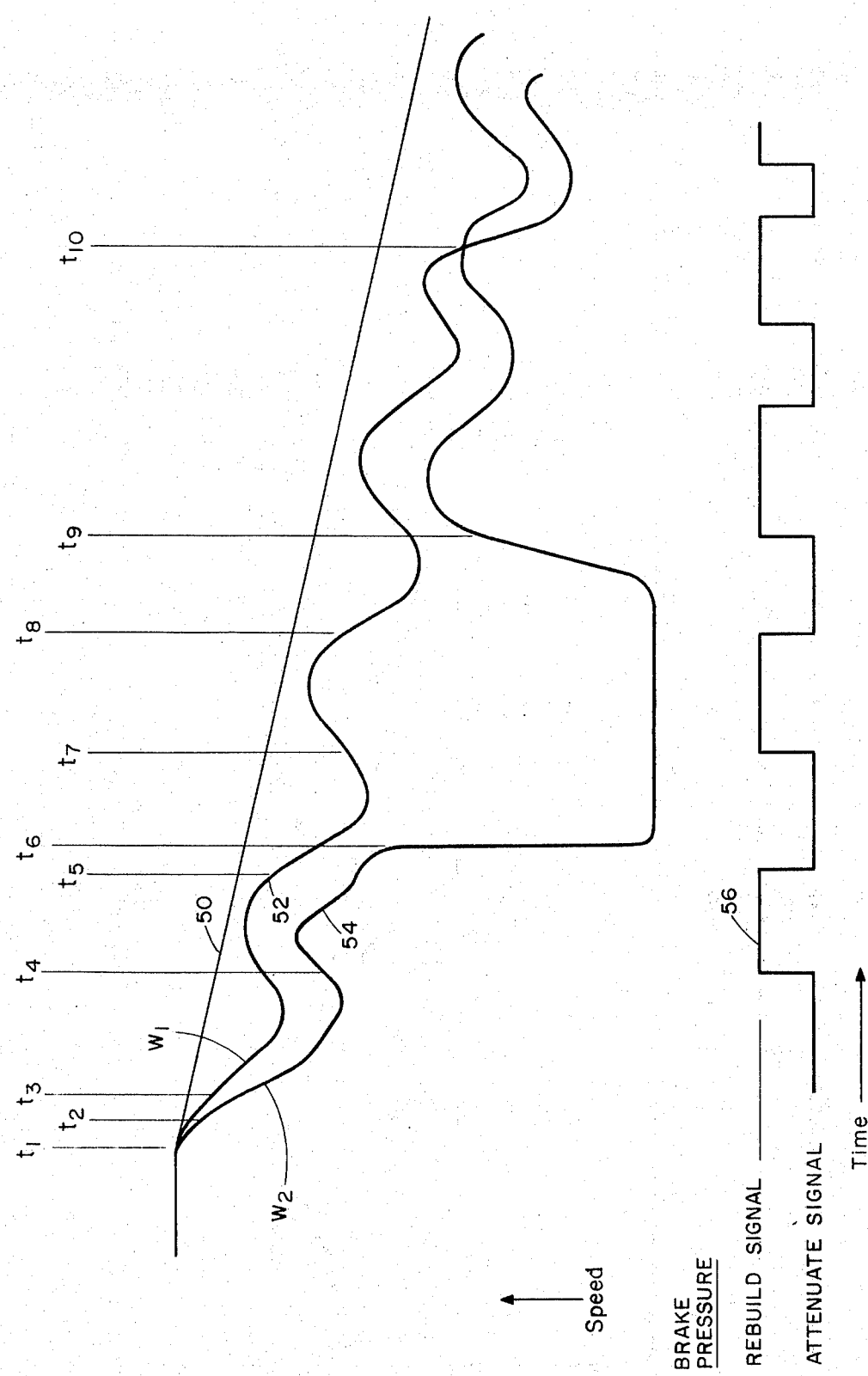
FIG. 2 shows wheel speeds, vehicle speed and brake pressure control signals during a brake stop using an adaptive braking system which includes the invention.

Refer now to FIG. 2 where curve 50 is a plot of vehicle speed, curve 52 is a plot of the speed of one wheel on an axle and herein termed wheel one, and curve 54 is a plot of the speed of the other axle wheel, herein termed wheel two, during an illustrative vehicle braked stop, and wherein an adaptive braking system operates to automatically control vehicle braking. It is assumed that the vehicle brakes are applied at time $t_1$ so that, prior to that time, vehicle and wheel speeds are synchronous and their plots coincide. At $t_1$, when the brakes are applied, the wheels decelerate more rapidly than the vehicle and, in particular, wheel two (W2) decelerates more rapidly than wheel one (W1). At $t_2$, the deceleration criteria for wheel two, that is the slower moving wheel, are assumed to be satisfied so that control logic 22, referring also to FIG. 1, generates a relatively high output signal indicating generally that brake pressure should now be attenuated. However, since at this time gate 36 is closed, the output signal from control logic 22 is ineffective to attenuate the braking pressure. At $t_3$, the deceleration criteria for wheel one, the faster moving wheel, are assumed to be met so that control logic 20 also generates a relatively high, or logic one output signal. Since at this time the speed of wheel two is relatively close to the speed of wheel one, comparator 24 is generating a logic 0 output signal. However, just prior to $t_3$, logic 28 was generating a logic 0 output signal which is inverted by inverter 20 and applied to delay circuit 30 and then to OR gate 32 as a logic 1 signal to qualify gate 26. Thus, the logic 1 output signal from control logic 20 which is generated at $t_3$ can pass through gate 26 and gate 38 to the brake pressure modulator 40 to attenuate the braking pressure. Curve 56 illustrates the times at which the signal to attenuate brake pressure and a subsequent signal to rebuild braking pressure are generated. The output signal from gate 38 is fed back to gate 36 which, together with the signal from inverter 34, opens this gate also. Remembering that control logic 22 is already generating a logic 1 output, it can be seen that at this time gate 36 is receiving a logic 1 input from both control logic 20 and control logic 22. After the delay introduced by delay circuit 30 the signal from inverter 28, which has now become a logic 0 signal, causes gate 26 to close so that gate 38 and hence, the brake pressure modulator 40 is controlled from the control logic 22.

In response to the attenuation of the braking pressure, both wheels will tend to increase speed towards the vehicle speed. At $t_4$ it is assumed that wheel two has its increase in speed sufficiently to satisfy the acceleration criteria of control logic 22 so that the output signal from control logic 22 goes to a logic 0 level. Accordingly, gate 36 closes so that gate 38 now generates a logic 0 output which is applied to modulator 40 to restore or rebuild wheel braking pressure. In addition, the logic 0 level from gate 38 is fed back to gate 36 to latch that gate closed. As the wheel braking force is increased the wheel acceleration will decrease so that eventually wheel speed of both wheels will again start to decline. Of course, some time approximately close to $t_4$, the wheel acceleration criteria for wheel one will have been satisfied so that control logic 20 also generates a logic 0 output, which, being inverted, qualifies gate 26. At $t_5$ the deceleration criteria of wheel one are again satisfied so that control logic 20 generates a logic 1 output signal and is applied to gate 26 to repeat the above described cycle. However, before the braking pressure can be sufficiently attenuated, whereby the wheels are once again accelerating, it is assumed that wheel two suddenly goes into lock-up at $t_6$. This can occur, for example, if wheel two hits an icy patch in the road. Since the speed of wheel two is now much less than the speed of wheel one, comparator 24 will generate a logic 1 output which applied through OR gate 32 qualifies gate 26 so that control of modulator 40 is shifted to control logic 20. With wheel one now controlling the action of the adaptive braking system, the braking pressure is rebuilt starting at $t_7$ and once again attenuated at $t_8$ when wheel one acceleration and deceleration criteria, respectively, of control logic 20 are satisfied. At a time after $t_8$ but before $t_9$ it is assumed that the braking efficiency of wheel two markedly improves, so that that wheel comes out of lock-up. Just prior to $t_9$ it is assumed that the ratio of the speed of wheel one with respect to the speed of wheel two is such that the comparator logic 1 output is extinguished, thus shifting control of modulator 40 to the control logic 22. At $t_9$ the acceleration criteria of control logic 22 are satisfied by wheel two so that once again brake pressure will built. At $t_{10}$ it is assumed that wheel two becomes the faster wheel. The operation of the system of FIG. 1 continues as before, except that now wheel two supplies the input information for control logic 20 and wheel one supplies the input information for control logic 22.

Although only a single embodiment of the invention has been shown, it should be understood that certain alterations and modifications will be obvious in the light of these teachings to those skilled in the art. For example, although gates were shown as items 26 and 36, it should be understood that in those adaptive braking systems wherein the control logic elements generate analog signals for controlling a brake pressure modulator the gates can suitably be replaced by electronic switches where, for example, a switch equivalent to gate 26 would be closed by a signal from gate 32 and a switch equivalent to gate 36 would be closed by a signal from inverter 34 and feedback from the modulator control signal. Other alterations and modifications to the invention should also be obvious, thus the invention is to be limited only by the true scope and spirit of the appended claims.

The invention claimed is:

1. In a wheeled vehicle braked by braking force, an adaptive braking system having means for attenuating braking force in response to a first signal and for subsequently restoring braking force in response to a second signal comprising:
   first means for generating a signal related to the speed of a first vehicle wheel;
   second means for generating a signal related to the speed of a second vehicle wheel;
   third means for selecting the signal related to the speed of the faster rotating wheel of said first and second vehicle wheels;
   fourth means for selecting the signal related to the speed of the slower rotating wheel of said first and second vehicle wheels;
   control logic means for generating a first group of said first and second signals in response to the selected signal related to the speed of the faster rotating wheel and for generating a second group of said first and second signals in response to the selected signal related to the speed of the slower rotating wheel;
   comparator means for generating a comparator output signal of a first sense when the speed of the faster rotating wheel is within a predetermined relationship with the speed of the slower rotating wheel and for generating a comparator output signal of a second sense when the speed of the faster rotating wheel is without a predetermined relationship with the speed of the slower rotating wheel; and,
   means for applying the first signal of said first group to said means for attenuating for only a predetermined time and then applying said second group of signals to said means for attenuating in response to said comparator output signal of a second sense, said means for applying being responsive to the second signal of said second group for again applying said first group of signals to said means for attenuating, said means for applying being additionally responsive to said comparator output signal of a first sense for continuously applying said first group of signals to said means for attenuating.

2. The adaptive braking system of claim 1 wherein said first and second vehicle wheels are on the same vehicle axle.

3. The adaptive braking system of claim 1 wherein said means for applying comprises:
   first gate means for communicating said first group to said means for attenuating and for subsequently restoring;
   delay means responsive to the first signal of said first group for opening said first gate means for said predetermined time,
   second gate means for communicating said second group to said means for attenuating and for subsequently restoring, said second gate means being open during the occurrence of said comparator output signal of a second sense while a first signal is applied to said means for attenuating and subsequently restoring, said first gate means being additionally open during the occurrence of said comparator output signal of a first sense,
   said first and second gate means including means for suppressing second signals communicated through one of said first and second gate means while a first signal is communicated through one of said first and second gate means.

4. The adaptive braking system of claim 1 wherein said second signal comprises the absence of said first signal.

5. In an adaptive braking system for a wheeled vehicle including control logic for substantially controlling braking force applied to at least some of the wheels of the vehicle by attenuating and subsequently rebuilding braking force in response to speed signals related to the speed of predetermined vehicle wheels, means for choosing a particular speed signal of at least two speed signals to which said control logic is to respond comprising:
   first means for selecting the speed signal related to the high speed wheel;
   second means for selecting the speed signal related to the low speed wheel; and,
   means for causing said control logic to respond to the speed signal selected by said first means to attenuate braking force and then to respond to the speed signal selected by said second means.

6. The means for choosing of claim 5 wherein said means for causing additionally includes means for forcing said control logic to respond to the speed selected by said first means when the speed of the high speed wheel exceeds a predetermined relationship with the speed of the low speed wheel.

7. The means for choosing of claim 6 wherein said speed signals are electrical signals.

8. The means for choosing of claim 7 wherein said means for forcing comprises means for comparing the speed signal related to the high speed wheel against the speed signal related to the low speed wheel.

* * * * *